United States Patent
Jacobsen

(10) Patent No.: US 7,802,968 B2
(45) Date of Patent: Sep. 28, 2010

(54) METHODS AND APPARATUS FOR REDUCING LOAD IN A ROTOR BLADE

(75) Inventor: Eric Morgan Jacobsen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1175 days.

(21) Appl. No.: 11/192,689

(22) Filed: Jul. 29, 2005

(65) Prior Publication Data

US 2007/0025859 A1    Feb. 1, 2007

(51) Int. Cl.
*F03D 1/06* (2006.01)

(52) U.S. Cl. .................. 416/228; 416/226; 416/230; 416/238; 416/241 A

(58) Field of Classification Search .......... 416/226, 416/228, 238, 230, 241 A
See application file for complete search history.

(56) References Cited

U.S. PATENT DOCUMENTS

| | | | | |
|---|---|---|---|---|
| 2,970,809 A | * | 2/1961 | Kroon | 416/219 R |
| 3,883,267 A | * | 5/1975 | Baudier et al. | 416/230 |
| 4,022,547 A | * | 5/1977 | Stanley | 416/230 |
| 4,168,939 A | * | 9/1979 | Schmitz et al. | 416/228 |
| 4,232,844 A | * | 11/1980 | Sobey | 244/123.3 |
| 4,266,442 A | * | 5/1981 | Zorzi | 74/572.12 |
| 4,366,387 A | | 12/1982 | Carter, Jr. et al. | |
| 4,697,988 A | | 10/1987 | Kentfield et al. | |
| 4,976,587 A | | 12/1990 | Johnston et al. | |
| 5,375,324 A | | 12/1994 | Wallace et al. | |
| 5,499,904 A | | 3/1996 | Wallace et al. | |
| 6,103,211 A | | 8/2000 | Matsuhisa et al. | |
| H2057 H | | 1/2003 | Veers et al. | |
| 7,118,338 B2 | * | 10/2006 | Moroz et al. | 416/1 |
| 2005/0180854 A1 | * | 8/2005 | Grabau et al. | 416/241 R |

FOREIGN PATENT DOCUMENTS

| | | | | |
|---|---|---|---|---|
| GB | 1328167 A | * | 8/1973 | |
| JP | 03-271566 A | * | 12/1991 | 416/230 |
| WO | 03078833 A1 | | 9/2003 | |

* cited by examiner

*Primary Examiner*—Christopher Verdier
(74) *Attorney, Agent, or Firm*—James McGinness, Esq.; Armstrong Teasdale LLP

(57) ABSTRACT

A blade includes a plurality of first fibers, wherein each of the plurality of first fibers is angled between about 5° and about 35° with respect to a pitch axis of the blade, and a plurality of second fibers, wherein each of the plurality of second fibers is angled between about 95° and about 125° with respect to the pitch axis of the blade.

16 Claims, 6 Drawing Sheets

METHODS AND APPARATUS FOR REDUCING LOAD IN A ROTOR BLADE

BACKGROUND OF THE INVENTION

This invention relates generally to blades that may be useful as wind turbine rotor blades and to rotors and wind turbines utilizing such blades.

Wind turbines have received increased attention as possible environmentally safe and relatively inexpensive alternative energy sources. With such growing interest, considerable efforts have been made to develop wind turbines that are reliable and efficient.

Generally, a wind turbine includes a rotor having multiple blades. The rotor is mounted on a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, generally but not always rotationally coupled to the rotor through a gearbox. The gearbox steps up the inherently low rotational speed of the turbine rotor for the generator to efficiently convert mechanical energy to electrical energy, which is fed into a utility grid. Gearless direct drive turbines also exist.

A diameter of wind turbine rotors is sometimes limited by loads subjected to the rotor by wind. For example, peak wind loads during operation of the rotor can cause rotors over a predetermined diameter and/or other components of the wind turbine to fail. Additionally, peak wind loads when the rotor is not operating (i.e., not turning) as well as general fatigue from peak wind loads over time can also cause rotors over a predetermined diameter and/or other components to fail. Passive pitch control of rotor blades (i.e., twist-bend coupling, or TBC) has been used to reduce wind turbine rotor blade loads, and therefore allow larger diameter rotors. Specifically, twisting of sections of the blade reduces an angle of attack of such sections with respect to the wind, thereby reducing peak transient loads that the blade experiences. However, TBC may increase a weight and/or a cost of wind turbine blades that may outweigh any operational gains from a larger diameter rotor. For example, some known rotor blades utilizing TBC are fabricated using carbon fibers angled at between about 5° and about 35° with respect to a pitch axis of the blade in a shell or spar of the blade. However, such known blades including carbon fibers may require an increased shell or spar thickness to provide adequate stiffness such that the blade does not bend and strike a tower of the wind turbine. The addition of more fibers angled at between about 5° and about 35° with respect to the pitch axis to increase a thickness of the shell or spar may increase a weight of the blade and/or a cost of the blade due to the extra material used to increase the thickness. The addition of more carbon fiber, especially at an angle with respect to the pitch axis, to such blades may further increase a cost of the rotor blade because of the more expensive carbon fibers.

Swept rotor blades have also been used to reduce loads in wind turbine rotor blades. However, a torsional stiffness of swept rotor blades may resist the desired twisting/bending of the rotor blade. Some known swept rotor blades are fabricated with a reduced airfoil thickness to reduce the torsional stiffness of the blade and thereby allow the blade to twist/bend. However, reducing the thickness of the airfoil of such swept rotor blades may require more material to provide adequate strength and stiffness to withstand shear loads, thereby possibly further increasing cost and/or weight of the blade because of the extra material.

BRIEF DESCRIPTION OF THE INVENTION

In one aspect, a blade includes a plurality of first fibers, wherein each of the plurality of first fibers is angled between about 5° and about 35° with respect to a pitch axis of said blade, and a plurality of second fibers, wherein each of the plurality of second fibers is angled between about 95° and about 125° with respect to the pitch axis of said blade.

In another aspect, a wind turbine includes a rotor having a hub and at least one blade extending outwardly from the hub. The blade includes a plurality of first fibers, wherein each of the plurality of first fibers is angled between about 5° and about 35° with respect to a pitch axis of said blade, and a plurality of second fibers, wherein each of the plurality of second fibers is angled between about 95° and about 125° with respect to the pitch axis of said blade.

In even another aspect, a method is provided for fabricating a blade using a mold having a shape corresponding to a predetermined shape of the blade. The method includes laying a plurality of first fibers in the mold such that each of the plurality of first fibers is angled between about 5° and about 35° with respect to a pitch axis of the predetermined shape of the blade, and laying a plurality of second fibers in the mold such that each of the plurality of second fibers is angled between about 95° and about 125° with respect to the pitch axis of the blade.

BRIEF DESCRIPTION OF THE DRAWINGS

Corresponding reference characters indicate corresponding parts throughout the several views of the drawings.

DETAILED DESCRIPTION OF THE INVENTION

As used herein, the term "blade" is intended to mean anything that provides reactive force when in motion relative to a surrounding fluid. As used herein, the term "sweep" refers to an angle of an elastic axis relative to a pitch axis of a blade, where the "elastic axis" refers to a locus of points defining a torsional or bending center at each spanwise section of the blade. As used herein, the term "wind turbine" is intended to mean anything that generates rotational energy from wind energy, and more specifically, converts kinetic energy of wind into mechanical energy. As used herein, the term "wind generator" is intended to mean a wind turbine that generates electrical power from rotational energy generated from wind energy, and more specifically, converts mechanical energy converted from kinetic energy of wind to electrical power. As used herein, the term "windmill" is intended to mean a wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
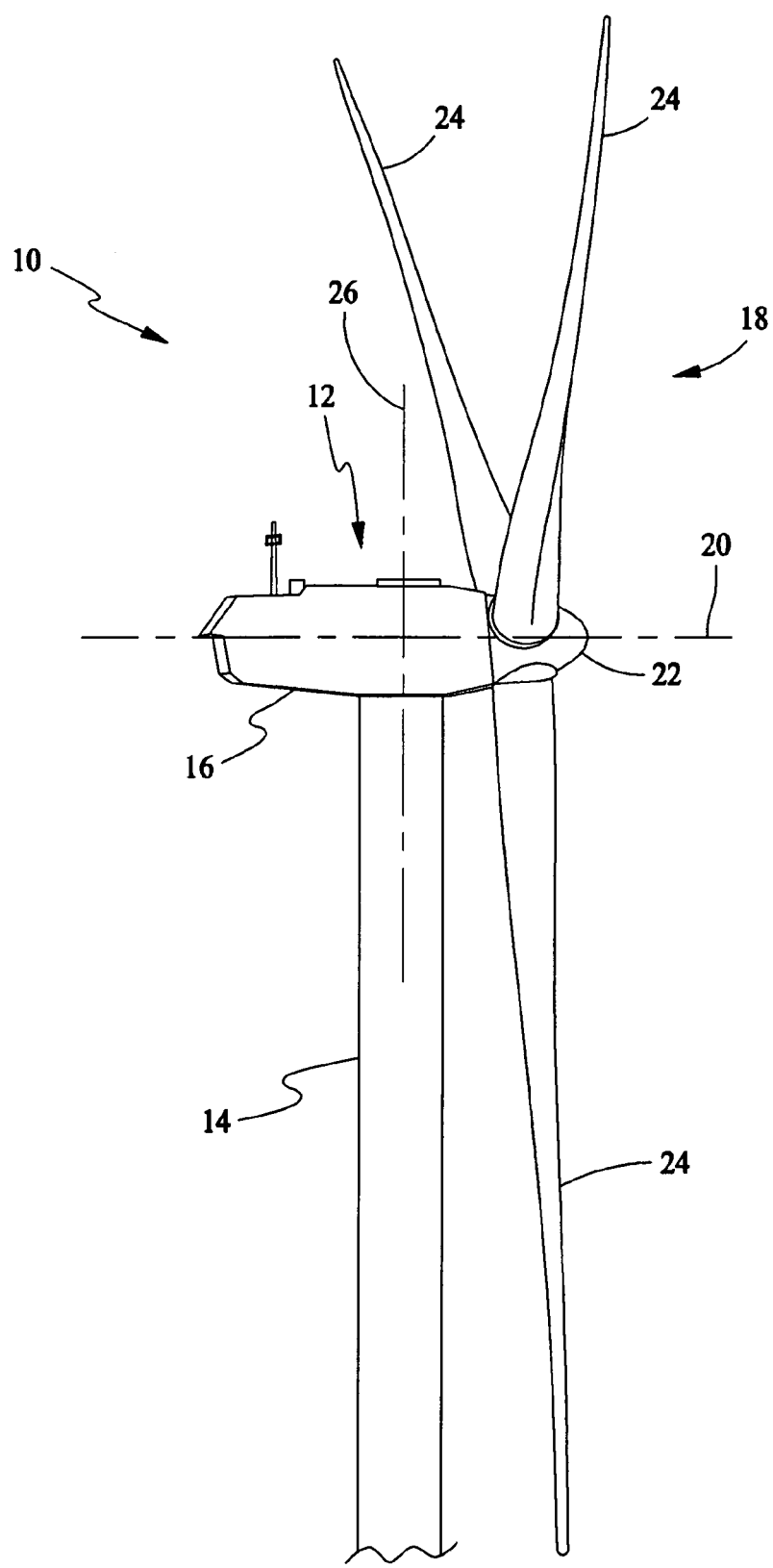
FIG. 1 is a perspective of an exemplary embodiment of a wind turbine.

Referring now to the drawings, and more specifically to FIG. 1, an exemplary embodiment of a wind turbine is designated in its entirety by the reference numeral 10. Wind turbine 10 described and illustrated herein includes a wind generator (generally designated by 12) for generating electrical power from wind energy. However, in some embodiments, wind turbine 10 may include, in addition or alternative to wind generator 12, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Although only one wind turbine 10 is shown in FIG. 1, in some embodiments a plurality of wind turbines 10 may be grouped together, sometimes referred to as a "wind farm".

As shown in FIG. 1, in some embodiments wind generator 12 is mounted on a tower 14 (only a portion of which is shown in FIG. 1), however, in some embodiments wind turbine 10 includes, in addition or alternative to tower-mounted wind generator 12, a wind generator (and/or other type of wind turbine) adjacent the ground and/or a surface of water. The height of tower 14 may be selected based upon factors and conditions known in the art. Wind generator 12 includes a body (generally designated by 16), sometimes referred to as a "nacelle", and a rotor (generally designated by 18) mounted on body 16 for rotation about an axis of rotation 20. Rotor 18 includes a hub 22 and a plurality of blades 24 (sometimes referred to as "airfoils") extending radially outwardly from hub 22 for converting wind energy into rotational energy. Rotor 18 is described and illustrated herein as having three blades 24. However, rotor 18 may have any number of blades 24. Blades 24 may each have any length (whether described herein). For example, in some embodiments one or more blades 24 are about 0.5 meters long, while in some embodiments one or more blades 24 are about 50 meters long. Other examples of blade 24 lengths include 10 meters or less, about 20 meters, about 37 meters, and about 40 meters. Still other examples include blades between 50 and 100 meters long. Moreover, despite how blades 24 are illustrated in FIG. 1, rotor 18 may have blades of any shape, and may have blades of any type and/or any configuration, whether such shape, type, and/or configuration is described and/or illustrated herein. One example of another type, shape, and/or configuration of blades 24 of rotor 18 is a ducted rotor (not shown) having a turbine (not shown) contained within a duct (not shown). Another example of another type, shape, and/or configuration of blades 24 of the rotor 18 is a darrieus wind turbine, sometimes referred to as an "eggbeater" turbine. Yet another example of another type, shape, and/or configuration of blades 24 of rotor 18 is a savonious wind turbine. Even another example of another type, shape, and/or configuration of blades 24 of rotor 18 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Wind generator 12 includes an electrical generator (not shown) mounted on body 16 and operatively connected to rotor 18 for generating electrical power from the rotational energy generated by rotor 18. General operation of the electrical generator to generate electrical power from the rotational energy of rotor 18 is known in the art and therefore will not be described in more detail herein.

In some embodiments, wind turbine 10 may include one or more controllers (not shown) mounted on body 16 and operatively connected to some or all of the components of wind generator 12 for generally controlling operation of wind generator 12 and/or as some or all of the components thereof (whether such components are described and/or illustrated herein). For example, the controller(s) may be used for overall system monitoring and control including, for example, pitch and speed regulation, high-speed shaft and yaw brake application, yaw and pump motor application, and fault monitoring. Alternative distributed or centralized control architectures may be used in some embodiments. In some embodiments, wind generator 12 may include a brake (not shown) mounted on the body 16 for braking rotation of rotor 18 to, for example, reduce the generation of electrical power from the electrical generator. Furthermore, in some embodiments, wind generator 12 may include a yaw drive (not shown) for rotating wind generator 12 about an axis of rotation 26 for changing a yaw of rotor 18, and more specifically for changing a direction faced by rotor 18 to, for example, adjust an angle between the direction faced by rotor 18 and a direction of wind. Moreover, in some embodiments the wind generator 12 may include an anemometer (not shown) for measuring wind speed. The anemometer, in some embodiments, may be operatively connected to the controller(s) for sending measurements to the controller for processing thereof. In some embodiments, wind generator 12 includes a wind vane (not shown) for measuring wind direction. The wind vane, in some embodiments, may be operatively connected to the controller(s) and/or the yaw drive for changing a yaw of rotor 18. In some embodiments, wind generator 12 includes a variable blade pitch drive (not shown) for controlling a pitch of rotor blades 24. The variable blade pitch drive may be operatively connected to the controller(s) for control thereby. In some embodiments, the pitches of blades 24 are individually controlled by the blade pitch drive. General operation of wind turbine 10, and more specifically wind generator 12, is known in the art and therefore will not be described in more detail herein.

Figure 2:
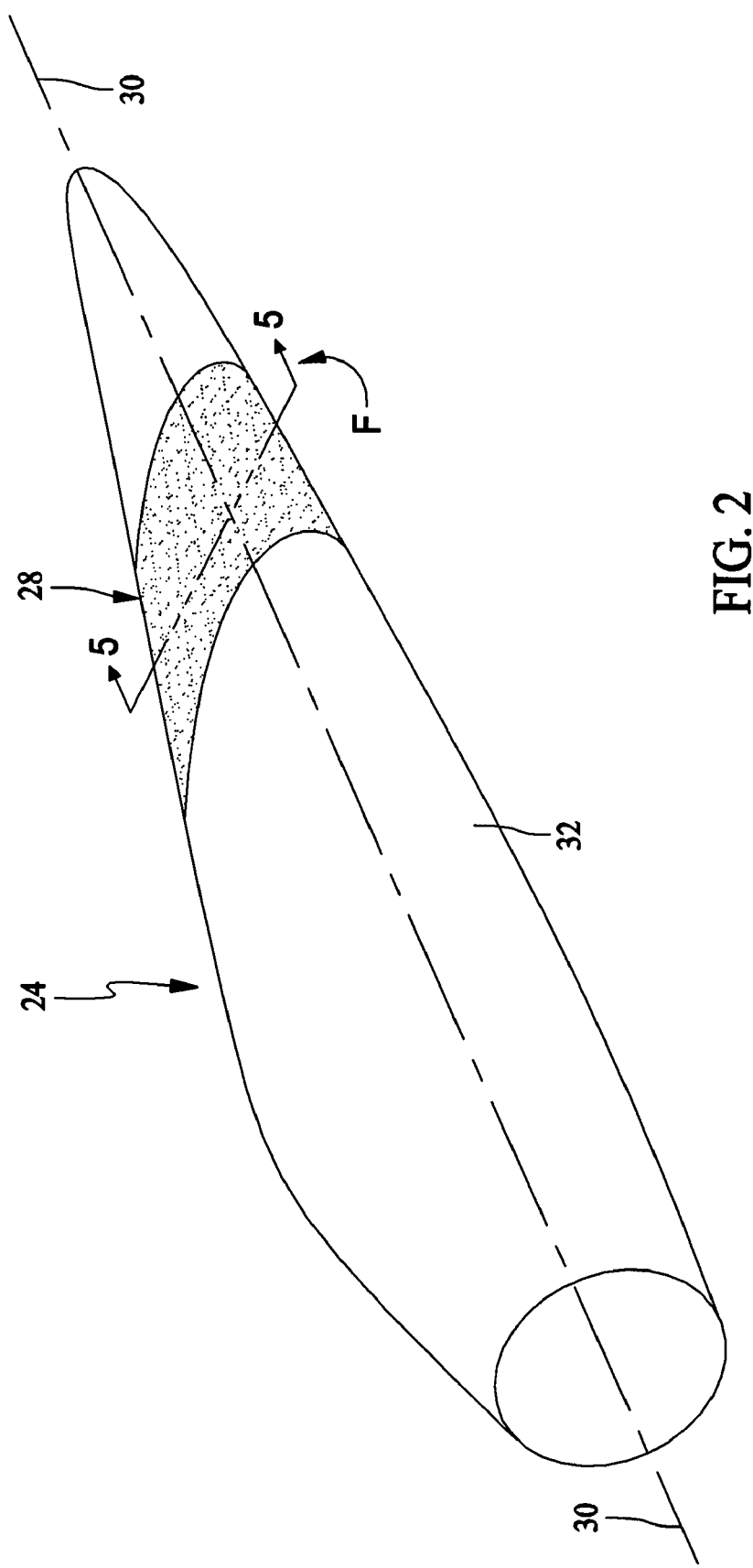
FIG. 2 is a perspective of an exemplary embodiment of a rotor blade for use with the wind turbine shown in FIG. 1.

In some embodiments, one or more of blades 24 are bend-twist coupled to rotor 18 such that blade(s) 24 changes its aerodynamic twist as it is loaded. For example, as shown in FIG. 2, a blade 24 includes a twist-bend coupled (TBC) section (generally designated by 28). TBC section 28 may comprise all, the majority, or some smaller portion of total blade 24 length. Wind loads acting on TBC section 28 create a moment force F acting on TBC section 28 that twists TBC section 28 about a pitch axis 30 extending along the length of blade 24. Such twisting about pitch axis 30 reduces an angle of attack of blade 24, and more specifically TBC section 28, with respect to the wind, thereby reducing peak loads experienced by TBC section 28 and/or other portions of blade 24. TBC section 28 may twist in any direction about pitch axis 30, depending of course on the direction of the wind and the orientation of blade 24 with respect thereto.

Figure 3:
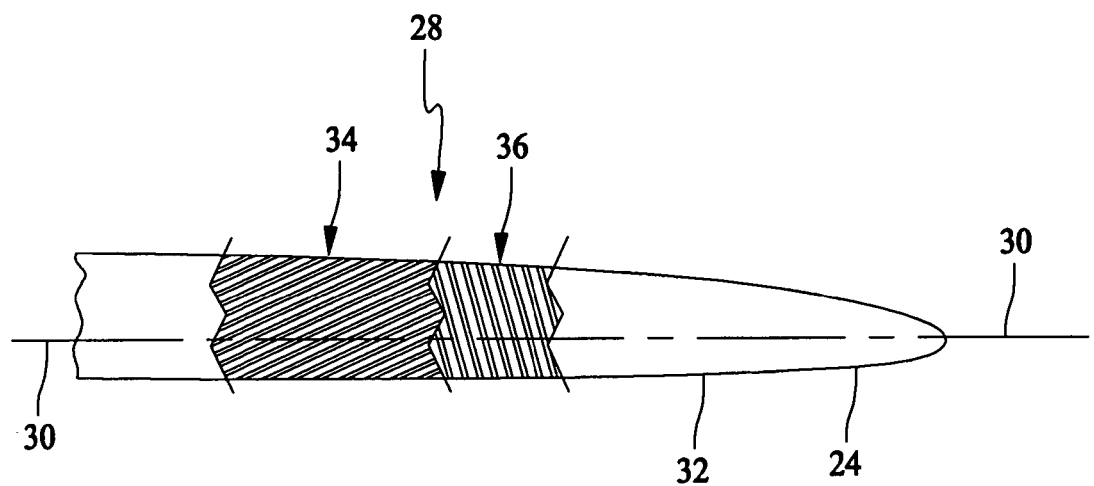
FIG. 3 is a schematic of a portion of the rotor blade shown in FIG. 2.

In some embodiments, blade 24 is fabricated using one or more laminated fiber layers, such as, but not limited to, including glass and/or carbon fibers, that form a shell 32 of blade 24. As shown in FIG. 3, to facilitate twisting of TBC section 28, a portion of shell 32 forming TBC section 28 includes a plurality of fibers (generally designated by 34) angled at between about 5° and about 35° with respect to pitch axis 30 of blade 24 and a plurality of fibers (generally designated by 36) are angled at between about 95° and about 125° (which could also be referred to as between about −85° and about −55°) with respect to pitch axis 30. Although fibers 34 and 36 may include any type of fiber, in some embodiments fibers 34 and/or 36 include glass and/or carbon fibers. Fibers 34 and 36 may be contained in separate layers of shell 32 that are laminated together, and/or may be woven together into one layer of shell 32. Moreover, in some embodiments some or all of fibers 34 and 36 overlap one another, while in other embodiments fibers 34 and 36 do not overlap one another. For example, in some embodiments wherein fibers 34 and 36 are contained within separate layers of shell 32, all or a portion of the layers may overlap one another. The orientation of fibers 34 and 36 with respect to pitch axis 30 and each other facilitates twisting of blade 24 about pitch axis 30 under wind load, to thereby reduce loads experienced by TBC section 28 and/or other portions of blade 24. For example, fibers 34 and 36 angled with respect to pitch axis 30 are therefore angled with respect to a bending direction of blades 24 such that elastic shearing of layers including fibers 34 and 36 is induced, thereby inducing blade 20 to twist.

In some embodiments, fibers 34 are angled at between about 15° and about 25° with respect to pitch axis 30 of blade 24 and fibers 36 are angled at between about 105° and about 115° (which could also be referred to as between about −65° and about −75°) with respect to pitch axis 30. As shown in FIG. 3, and for example, fibers 34 are angled at about 20° with respect to pitch axis 30 of blade 24 and fibers 36 are angled at about 110° (which could also be referred to as about −70°) with respect to pitch axis 30. Although TBC section 28 may twist about pitch axis 30 through any range of angles, in some embodiments TBC section 28 twists between about 2° and about 15° about pitch axis 30 from its unloaded orientation with respect to pitch axis 30 under wind loadings.

To further facilitate twisting of TBC section 28 about pitch axis 30, in some embodiments some or all of fibers 34 may be heavier than some or all of fibers 36. For example, in some embodiments an overall weight of fibers 34 within blade 24 may be heavier than an overall weight of fibers 36 within blade 24 due to, for example, a higher concentration of fibers 34, a larger size of each of fibers 34, and/or a thickness of a layer (whether woven with fibers 36 or forming a separate layer) of fibers 34. The heavier weight of fibers 34 may further facilitate twisting of blade 24 about pitch axis 30 under wind load, to thereby reduce loads experienced by TBC section 28 and/or other portions of blade 24. For example, because fibers 34 are more closely angled with respect to pitch axis 30, fibers 34 may experience more bending stress and therefore carry a higher load than fibers 36. As fibers 36 experience less bending stress than fibers 34, fibers 36 can be lighter and thereby provide less resistance to twisting of blade 24 about pitch axis 30. In some embodiments, some or all of fibers 36 may be heavier than some or all of fibers 34.

Figure 4:
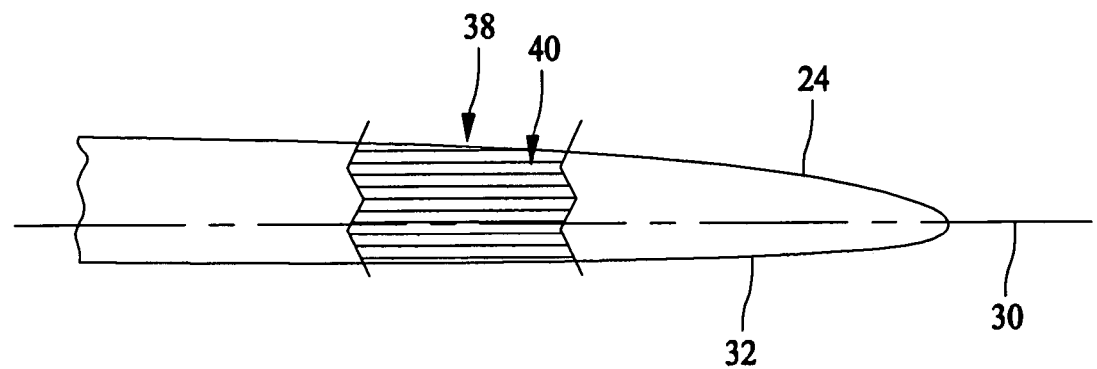
FIG. 4 is a schematic of a portion of the rotor blade shown in FIG. 2.
Figure 5:
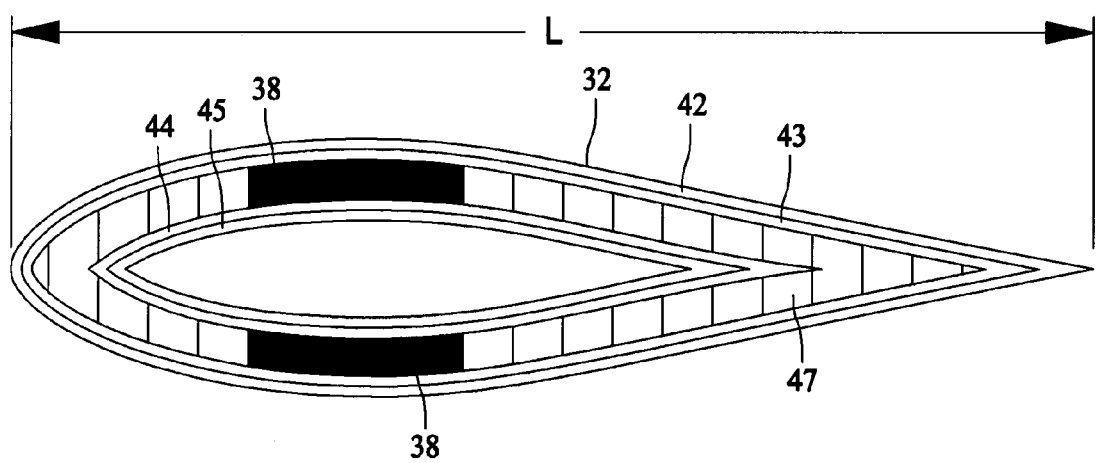
FIG. 5 is a cross section of one embodiment of a rotor blade shown in FIG. 2 taken about line 5-5.

Shell 32 of blade 24 may also be fabricated using other laminated fiber or other (e.g., plastic or metallic) layers, in addition to fibers 34 and 36, to provide additional structure to shell 32. For example, as shown in FIG. 4, in some embodiments, in addition to fibers 34 and 36 (contained within one or more laminated layers and shown in FIG. 3), shell 32 includes one or more fiber layer(s) (generally designated by 38) having fibers (generally designated by 40) extending about parallel with pitch axis 30 for facilitating increasing a flapwise stiffness of blade 24. Fibers 34 and 36, including layers thereof (whether separate or containing both fibers 34 and 36), and any other layers of shell 32 may have any configuration, such that each layer may be located anywhere on blade 24 including anywhere within a laminated stack of layers forming shell 32. For example, as shown in FIG. 5 in some embodiments shell 32 includes layer 38 sandwiched between two layers 42 and 43 of fibers 34 and 36 (FIG. 3) and two layers 44 and 45 of fibers 34 and 36. As can be seen from FIG. 5, in some embodiments layer 38 is narrower than a chord length L of blade 24. However, as shown in FIG. 4, some or all of layer 38 may also extend generally equal to the chord length L of blade 24. Referring again to FIG. 5, blade 24 may also include other structure, for example, core material 47, which may be sandwiched between layers 42 and 43 and layers 44 and 45, and/or one or more struts (not shown) for generally supporting and/or strengthening blade 24. For example, such other structure may internally support shell 32 against, for example, buckling due to wind loading.

To further facilitate twisting of TBC section 28 about pitch axis 30, in some embodiments shell 32 includes no more than about 10% weight of a plurality of fibers (including resin bonded thereto) angled between about 40° and about 50° (and/or between about 130° and about 140°, which may also be referred to as between about −40° and about −50°) with respect to pitch axis 30 between about a 25% and about a 95% spanwise length of blade 24 (whether such fibers are contained within another layer, for example a layer containing fibers 34 and/or 36, or its own separate layer). For example, fibers angled at between about 40° and about 50° and fibers angled at between about 130° and about 140° may resist twisting of blade 24 about pitch axis 30 because resin shearing between the fibers is generally symmetrical. Moreover, when the fibers angled at between about 40° and about 50° are generally of the same weight as fibers angled at between about 130° and about 140°, the fibers generally share the same load thereby further resisting twisting of blade 24.

Although TBC section 28 is described and illustrated herein as a passive TBC section, in some embodiments blade 24 may include active devices for controlling twist of TBC section 28 about pitch axis 30. For example, in some embodiments blade 24 includes one or more internal damper(s) (not shown) to attenuate twisting of TBC section 28, one or more internal limiter(s) (not shown) to limit twisting of TBC section 28, and/or one or more internal actuator(s) (not shown) to actively twist TBC section 28 about pitch axis 30.

Figure 6:
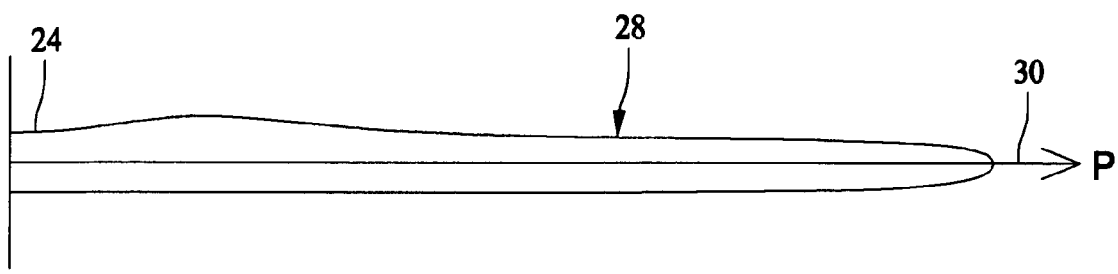
FIG. 6 is graphical representation of one embodiment of a rotor blade shown in FIG. 1.

Although, as discussed above, blade(s) 24 may have any suitable type, shape, and/or configuration, in some embodiments one or more blade(s) 24 is a "straight" blade that does not include any sweep, as shown in FIG. 6. As discussed above, the orientation of fibers 34 and 36 (FIG. 3) with respect to pitch axis 30 and each other facilitates twisting of blade 24 about pitch axis 30 under wind load, to thereby reduce loads experienced by TBC section 28 and/or other portions of blade 24. Although the orientation of fibers 34 and 36 may facilitate twisting of TBC section 28 about pitch axis 30 through any range of angles, in some embodiments wherein blade 24 is a straight blade, the orientation of fibers 34 and 36 produces twisting of TBC section 28 between about 2° and about 5° about pitch axis 30 under wind loading.

Figure 7:
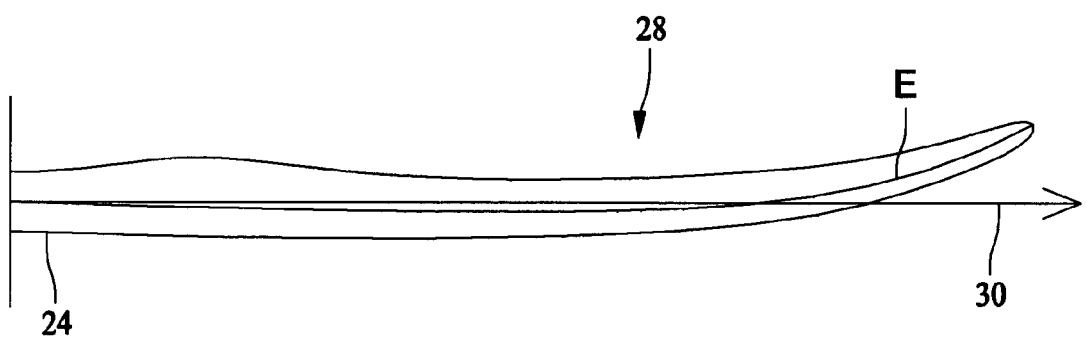
FIG. 7 is graphical representation of another embodiment of a rotor blade shown in FIG. 1.

Although, as discussed above, blade(s) 24 may have any suitable type, shape, and/or configuration, in some embodiments one or more blade(s) 24 is a "swept" blade that is swept relative to an elastic axis E (in a plane of rotation of rotor 18, shown in FIG. 1), an example of which is shown in FIG. 7. Although blade 24 is shown in FIG. 7 as generally including a forward and an aft sweep, in some embodiments blade 24 includes only an aft or only a forward sweep. Specifically, the particular blade 24 shown in FIG. 7 is meant as exemplary only. Blade 24 may have any type, configuration, angle, and/or shape of sweep, whether described and/or illustrated herein. Depending upon the type, configuration, and/or shape of sweep, the sweep of blade 24 may facilitate twisting of blade 24 about pitch axis 30 under wind load. Although the sweep of blade 24 may facilitate twisting of TBC section 28 about pitch axis 30 through any range of angles, in some embodiments wherein blade 24 is a swept blade, the sweep of blade 24 produces twisting of TBC section 28 between about 2° and about 5° about pitch axis 30 under wind loading. As discussed above, the orientation of fibers 34 and 36 (FIG. 3) with respect to pitch axis 30 and/or each other also facilitates twisting of blade 24 about pitch axis 30 under wind load. Although the orientation of fibers 34 and 36 may facilitate twisting of TBC section 28 about pitch axis 30 through any range of angles, in some embodiments wherein blade 24 is a swept blade, the orientation of fibers 34 and 36 produces twisting of TBC section 28 between about 2° and about 5° about pitch axis 30 under wind loading.

In some embodiments, the orientation of fibers 34 and 36 with respect to pitch axis 30 may decrease a torsional stiffness of blade 24. Some swept blades 24 may generally have a torsional stiffness that resists twisting about pitch axis 30. To reduce the torsional stiffness, some known rotor blades may be fabricated with a reduced blade thickness. However, reducing a thickness of blade 24 to reduce the torsional stiffness of blade 24 may cause blade 24 to be damaged and/or fail under wind loads acting on blade 24 generally perpendicularly to pitch axis 30 ("shear loads"). Accordingly, the orientation of fibers 34 and 36 with respect to pitch axis 30 may facilitate reducing the torsional stiffness of blade 24 without reducing a thickness of blade 24. Although the orientation of fibers 34 and 36 may facilitate reducing the torsional stiffness of blade 24 such that TBC section 28 twists about pitch axis 30 through any range of angles, in some embodiments wherein blade 24 is a swept blade, the orientation of fibers 34 and 36 reduces the torsional stiffness of blade 24 such that the reduced torsional stiffness of blade 24 produces twisting of TBC section 28 between about 2° and about 5° about pitch axis 30 under wind loading. Accordingly, in some embodiments wherein blade 24 is a swept blade, the additive production of twist from the sweep of blade 24, the orientation of fibers 34 and 36 with respect to pitch axis 30 and/or each other, and the reduced torsional stiffness of blade 24 due to the orientation of fibers 34 and 36 may produce twisting of TBC section 28 between about 2° and about 15° about pitch axis 30 under wind loading.

Figure 8:
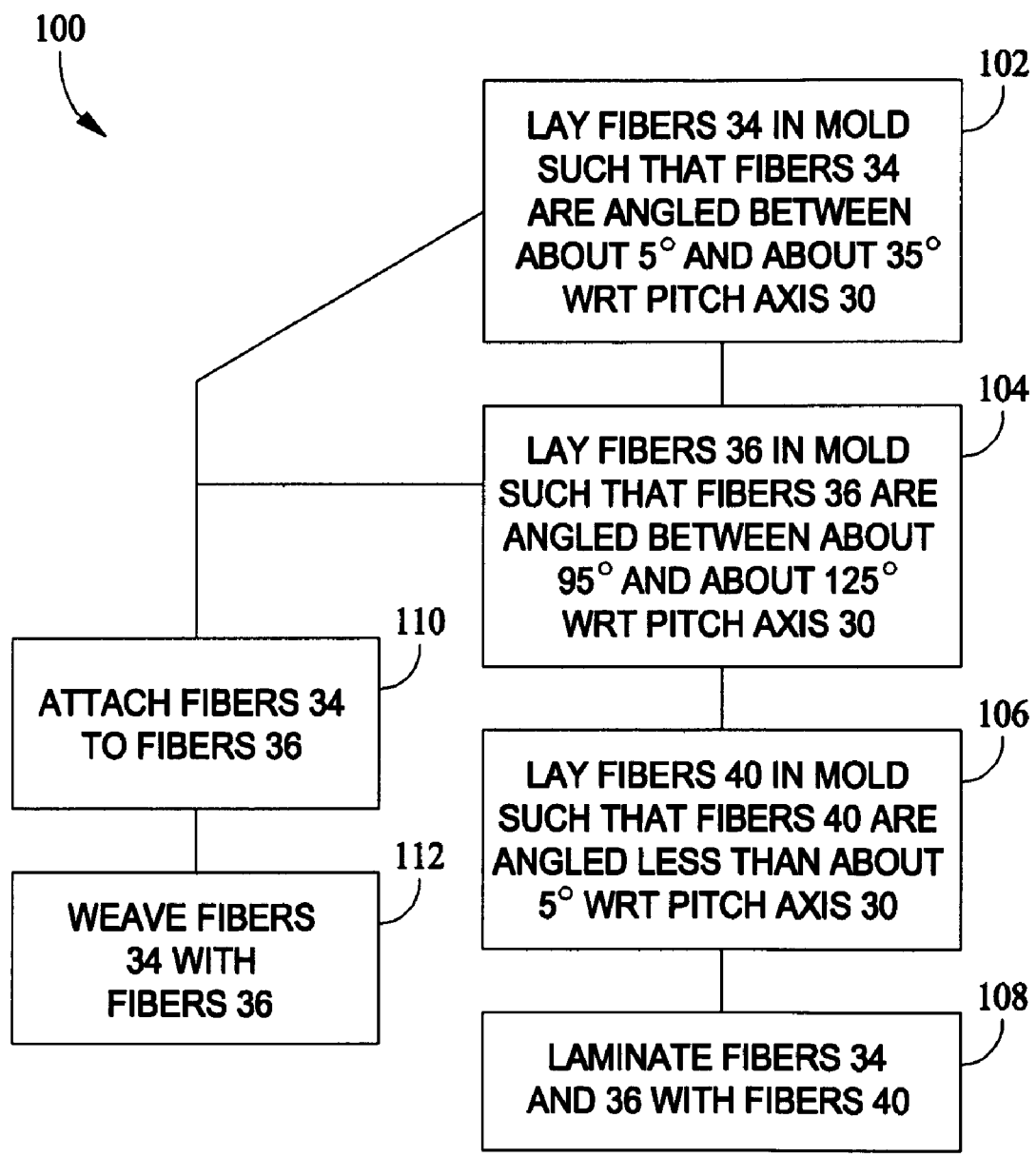
FIG. 8 is a flowchart illustrating an exemplary embodiment of a method for fabricating the rotor blade shown in FIG. 1.

FIG. 8 is a flowchart illustrating an exemplary embodiment of a method 100 for fabricating rotor blade 24 (FIGS. 1-6). Method 100 includes laying 102 fibers 34 (FIG. 3) in a mold (not shown) having a shape corresponding to a predetermined shape of blade 24 such that fibers 34 are each angled between about 5° and about 35° with respect to pitch axis 30 (FIG. 3), and laying 104 fibers 36 in the mold such fibers 36 are each angled between about 95° and about 125° with respect to pitch axis 30. In some embodiments, method 100 also includes laying 106 a plurality of fibers 40 (FIG. 4) in the mold such fibers 40 are each angled less than about 5° with respect to pitch axis 30, and laminating 108 fibers 34 and 36 with fibers 40 (and/or other layers/structure) to form shell 32 of blade 24.

In some embodiments, laying 102 fibers 34 and laying 104 fibers 36 includes attaching 110 fibers 34 to fibers 36, and laying 112 the attached fibers 34 and 36 in the mold. Moreover, in some embodiments attaching 110 fibers 34 to fibers 36 includes weaving fibers 34 with fibers 36.

In some embodiments, laying 102 fibers 34 includes laying fibers 34 in the mold such that fibers 34 are each angled between about 15° and about 25° with respect to pitch axis 30. In some embodiments, laying 104 fibers 36 includes laying fibers 36 in the mold such that fibers 36 are each angled between about 105° and about 115° with respect to pitch axis 30.

The methods and blades described and/or illustrated herein may facilitate cost-effective, reliable, and safe reduction of load within a rotor blade. For example, fibers orientated within a shell of the rotor blade as described and illustrated herein may facilitate twisting of the blade about a pitch axis thereof during wind loadings. Such twisting may facilitate a reduction of loads within the blade due to a change in an angle of attack of the blade with respect to a direction of wind. The orientation of fibers as described and illustrated herein may facilitate such twisting as well facilitate providing the blade with a strength that allows the blade to twist as such without being damaged and/or failing. For example, the orientation of fibers as described and illustrated herein may facilitate increasing a flapwise stiffness of the blade to strengthen the blade against, for example, shear loads. Accordingly, the orientation of fibers as described and illustrated herein may facilitate providing a predetermined twist without increasing a thickness of the shell of the blade, thereby possibly decreasing or maintaining a cost and weight of the blade. Moreover, when glass fibers are used in place of more expensive fibers, such as, but not limited to, carbon fibers, the strength provided by the orientation of fibers described and illustrated herein may possibly decrease or maintain a cost and weight of the blade. Furthermore, in swept blades the fiber orientation described and illustrated herein may facilitate reducing a torsional stiffness of the blade without decreasing a thickness of the blade that may lead to damage and/or failure under wing loadings.

Embodiments of methods and blades of the present invention are described and illustrated herein with respect to a wind turbine, and more specifically, a wind generator. However, embodiments (whether described and/or illustrated herein) of the methods and blades of the present invention are not limited to wind generators, nor wind turbines generally. Rather, embodiments (whether described and/or illustrated herein) of the methods and blades of the present invention may be applicable to anything having one or more blades.

Exemplary embodiments of the present invention are described and/or illustrated herein in detail. The embodiments are not limited to the specific embodiments described herein, but rather, components and steps of each embodiment may be utilized independently and separately from other components and steps described herein. Each embodiment's components and steps can also be used in combination with other embodiment's (whether described and/or illustrated herein) components and/or steps.

When introducing elements of the embodiments of the present invention, the articles "a", "an", "the" and "said" are intended to mean that there are one or more of the elements. The terms "comprising", "including" and "having" are intended to be inclusive and mean that there may be additional elements other than the listed elements. Moreover, use of the term "portion" with respect to something is intended to some or all of the thing.

While the invention has been described in terms of various specific embodiments, those skilled in the art will recognize that embodiments (whether described and/or illustrated herein) of the present invention can be practiced with modification within the spirit and scope of the claims.

What is claimed is:

1. A blade comprising:
   a plurality of first fibers, wherein each of said plurality of first fibers is angled between 5° and 35° with respect to a pitch axis of said blade; and
   a plurality of second fibers, wherein each of said plurality of second fibers is angled between 95° and 125° with respect to the pitch axis of said blade, wherein said plurality of first fibers is heavier than said plurality of second fibers, and wherein said plurality of first fibers and said plurality of second fibers are disposed to facilitate a twist of said blade about the pitch axis in response to an aerodynamic bending load on said blade.

2. A blade in accordance with claim 1 wherein each of said plurality of first fibers is angled between 15° and 25° with respect to the pitch axis of said blade, and each of said plurality of second fibers is angled between 105° and 115° with respect to the pitch axis of said blade.

3. A blade in accordance with claim 1 wherein said plurality of first fibers comprise at least one of glass fibers and carbon fibers.

4. A blade in accordance with claim 1 wherein said plurality of second fibers comprise at least one of glass fibers and carbon fibers.

5. A blade in accordance with claim 1 wherein the twist is between 2° and 15°.

6. A blade in accordance with claim 1 wherein said blade comprises a swept blade.

7. A blade in accordance with claim 1 wherein said blade comprises a wind turbine rotor blade.

8. A blade in accordance with claim 1 wherein said blade comprises a plurality of third fibers resin-bonded to each other and disposed between a 25% and a 95% spanwise length of said blade, wherein said plurality of third fibers is angled at between 40° and 50° with respect to the pitch axis of said blade and comprises no more than 10% of the weight of a shell of said blade.

9. A wind turbine comprising a rotor having a hub and at least one blade extending outwardly from the hub, said blade comprising:
   a plurality of first fibers, wherein each of said plurality of first fibers is angled between 5° and 35° with respect to a pitch axis of said blade; and
   a plurality of second fibers, wherein each of said plurality of second fibers is angled between 95° and 125° with respect to the pitch axis of said blade, wherein said plurality of first fibers is heavier than said plurality of second fibers, and wherein said plurality of first fibers and said plurality of second fibers are disposed to facilitate a twist of said at least one blade about the pitch axis in response to an aerodynamic bending load on said at least one blade.

10. A wind turbine in accordance with claim 9 wherein each of said plurality of first fibers is angled between 15° and 25° with respect to the pitch axis of said blade, and each of said plurality of second fibers is angled between 105° and 115° with respect to the pitch axis of said blade.

11. A wind turbine in accordance with claim 9 wherein said plurality of first fibers comprise at least one of glass fibers and carbon fibers.

12. A wind turbine in accordance with claim 9 wherein said plurality of second fibers comprise at least one of glass fibers and carbon fibers.

13. A wind turbine in accordance with claim 9 wherein the twist is between 2° and 15°.

14. A wind turbine in accordance with claim 9 wherein said at least one blade comprises a swept blade.

15. A wind turbine in accordance with claim 9 wherein said blade comprises a plurality of third fibers resin-bonded to each other, said plurality of third fibers is angled at between 40° and 50° with respect to the pitch axis of said blade and comprises no more than 10% of the weight of a shell of said blade.

16. A blade comprising:
   a plurality of first fibers, wherein each of said plurality of first fibers is angled between 5° and 35° with respect to a pitch axis of said blade;
   a plurality of second fibers, wherein each of said plurality of second fibers is angled between 95° and 125° with respect to the pitch axis of said blade, said plurality of first fibers and said plurality of second fibers disposed to facilitate a twist of said blade about the pitch axis in response to an aerodynamic bending load on said blade; and
   a plurality of third fibers resin-bonded to each other and disposed between a 25% spanwise length and a 95% spanwise length of said blade, wherein said plurality of third fibers is angled at between 40° and 50° with respect to the pitch axis of said blade and comprises no more than 10% of the weight of a shell of the blade.

* * * * *